Jos. Barker, Separator Sieves
Assigned to Self & Alonzo Kinyon

74483  
PATENTED FEB 18 1868

Witnesses  
H. C. Ashkettle  
Theo. Tuske

Inventor  
Jos. Barker  
per Munn & Co.  
Attorneys

United States Patent Office.

JOSEPH BARKER, OF AMBOY, ILLINOIS, ASSIGNOR TO HIMSELF AND ALONZO KINYON, OF SAME PLACE.

Letters Patent No. 74,483, dated February 18, 1868.

IMPROVEMENT IN SEPARATOR-SIEVES.

The Schedule referred to in these Letters Patent and making part of the same.

TO ALL WHOM IT MAY CONCERN:

Be it known that I, JOSEPH BARKER, of Amboy, in the county of Lee, and State of Illinois, have invented a new and useful Improvement in Separator-Sieves; and I do hereby declare that the following is a full, clear, and exact description thereof, which will enable others skilled in the art to make and use the same, reference being had to the accompanying drawings forming part of this specification.

This invention relates to a new and improved method of constructing the sieves of fanning-mills, whereby one kind of seed is more perfectly separated from another, and whereby the same more easily free themselves from chaff and refuse.

It consists of a frame covered with wire gauze on both sides, a portion of the wire gauze on one end of the frame being coarser.

It consists also in the frame being inclined at the back end of the same, whereby the same cleans itself from chaff or refuse. In the accompanying plate of drawings—

Similar letters of reference indicate corresponding parts.

Figure 1:
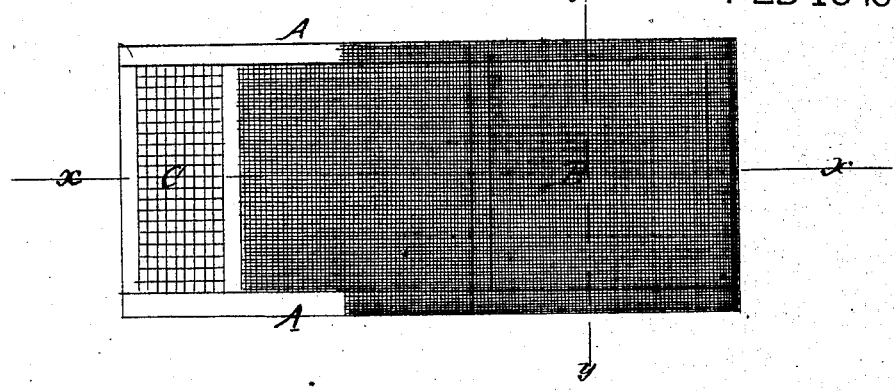
Figure 1 is a plan view of my invention.
Figure 2:
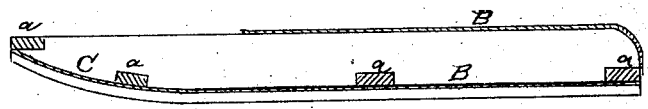
Figure 2 is a longitudinal section of the same, taken in the line $x$ $x$, fig. 1.
Figure 3:
Figure 3 is a cross-section of the same, taken in the line $y$ $y$, fig. 1.

A is the frame; B is the wire gauze or netting; C is coarser wire gauze; $a$ are strips on the frame A. The frame A is constructed of wood, or other suitable material, composed of two sides, with cross-strips on one edge, said sides being formed so as that the sieve will be inclined upon the shoe at a greater angle than the sieves now commonly in use, said sides being also provided, upon one or the inclined edge of the same, with the strips $a$, or their equivalent, by means of which said strips the pitch of the sieve on the shoe is regulated. The strips $a$ are made of wood, or other suitable material, are narrower than the thickness of the sides of the frame A, and secured thereto by screws, or in any convenient way. The frame A is covered, upon both the top and bottom sides, with a wire gauze or netting C, which, commencing a little one side of the middle of the same on one side, extends around one end of the frame A, and nearly to the other end of the same, from which point said frame is further covered, on the same side, to the end of the frame, with a coarser wire netting C, as shown in the drawing, and so as to form a double sieve.

The operation is such that the inclination of the sieve causes the same to free itself from chaff or refuse, and the coarser netting separates one kind of seed, as clover-seed, from another kind of seed, as timothy-seed.

I claim as new, and desire to secure by Letters Patent—

A double sieve, for separating seeds, of coarser and finer netting, having the sides of the same so shaped as to incline the sieve to the shoe, in fanning-mills, said sides being provided with the strips $a$, or their equivalent, substantially as shown and described, and for the purposes set forth.

The above specification of my invention signed by me, this 25th day of November, 1867.

JOSEPH BARKER.

Witnesses:
 WILLIAM B. ANDREWS,
 JOSIAH LITTLE.